United States Patent [19]

Wallace

[11] Patent Number: 4,593,734

[45] Date of Patent: Jun. 10, 1986

[54] FRAME ROUTING APPARATUS

[75] Inventor: Robert S. Wallace, Los Angeles, Calif.

[73] Assignee: M. Bosley Wright, Owings Mills, Md.

[21] Appl. No.: 646,440

[22] Filed: Sep. 4, 1984

Related U.S. Application Data

[63] Continuation-in-part of Ser. No. 535,784, Sep. 26, 1983, Pat. No. 4,493,583.

[51] Int. Cl.⁴ .............................................. B26D 1/12
[52] U.S. Cl. ............................. 144/136 R; 144/218; 144/240; 407/34; 407/54
[58] Field of Search .................. 407/34, 53, 54; 144/2 R, 134 R, 134 D, 136 R, 136 C, 218, 240, 241

[56] References Cited

U.S. PATENT DOCUMENTS

| | | | |
|---|---|---|---|
| 2,840,128 | 6/1958 | Slusser | 144/218 X |
| 3,765,789 | 10/1973 | Hougen | 407/53 |
| 4,034,452 | 7/1977 | Edming | 407/54 |

FOREIGN PATENT DOCUMENTS

| | | | |
|---|---|---|---|
| 131273 | 4/1951 | Sweden | 144/218 |
| 26411 | 8/1902 | Switzerland | 407/53 |
| 753233 | 7/1956 | United Kingdom | 407/54 |

*Primary Examiner*—W. D. Bray
*Attorney, Agent, or Firm*—William W. Haefliger

[57] ABSTRACT

A special router for cutting an L-shaped groove in elongated frame members has an elongated cutter stem and an axis about which the stem is rotatable; the stem has substantially parallelogram cross sections in planes normal to that axis; and a cutter head is provided at the end of the stem and integral therewith, the head also having substantially prallelogram cross sections in planes normal to that axis. Further, the router head has generally outwardly convex outer surfaces and opposite flat sides intersecting said curved outer surfaces. The router is movable laterally to cut L-shaped grooves in the frame members, which are adapted to have their grooved ends joined by an L-shaped bracket receivable into the grooves to hold the members in L-shaped assembly.

9 Claims, 14 Drawing Figures

U.S. Patent   Jun. 10, 1986   Sheet 1 of 4   4,593,734
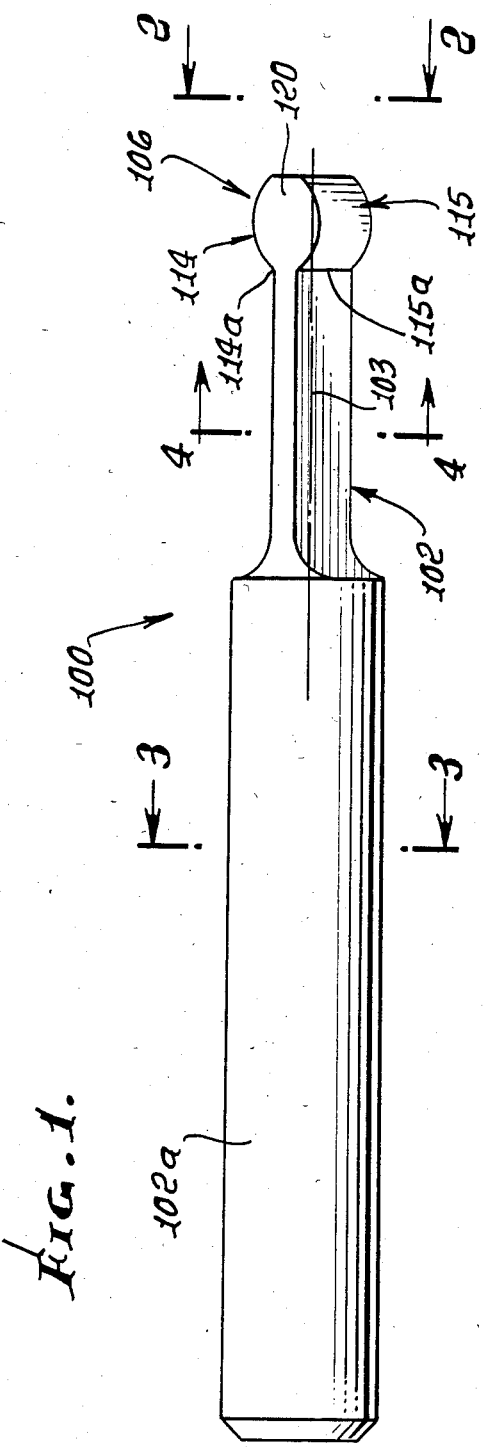
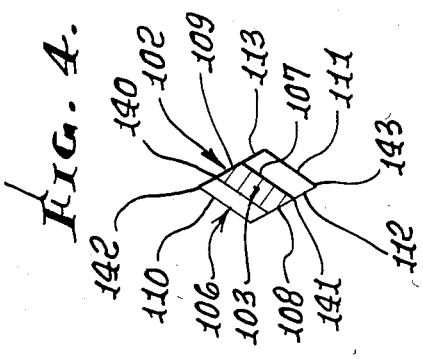
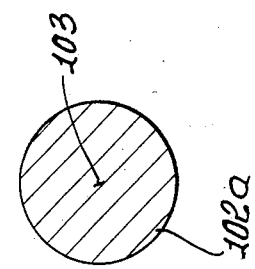
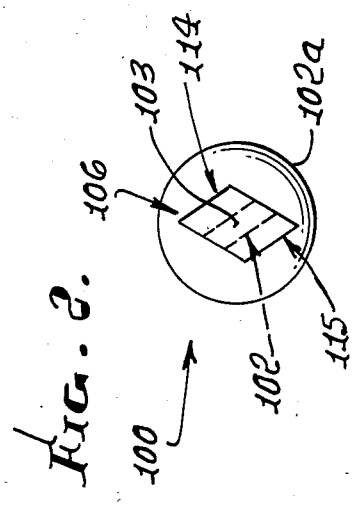

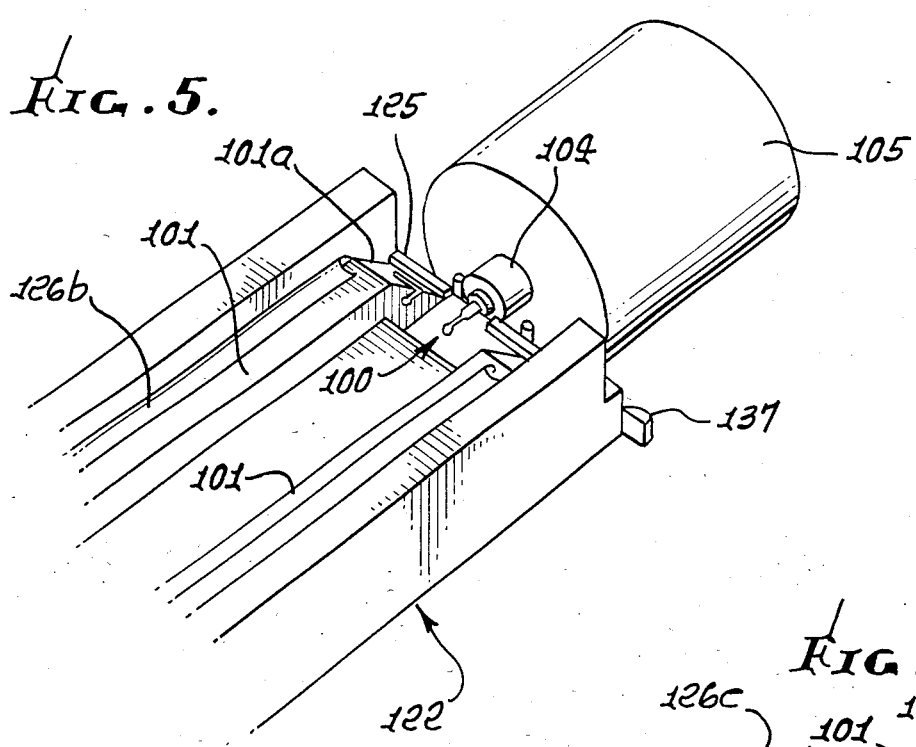
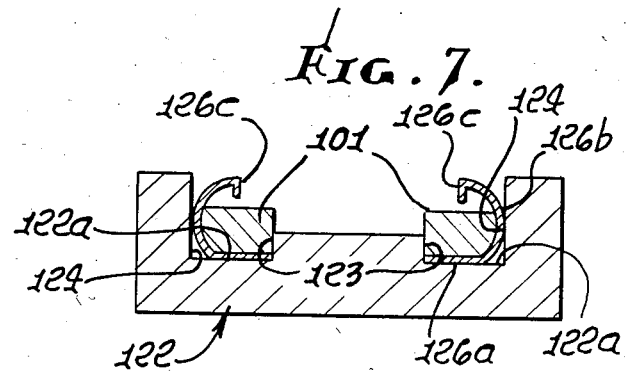
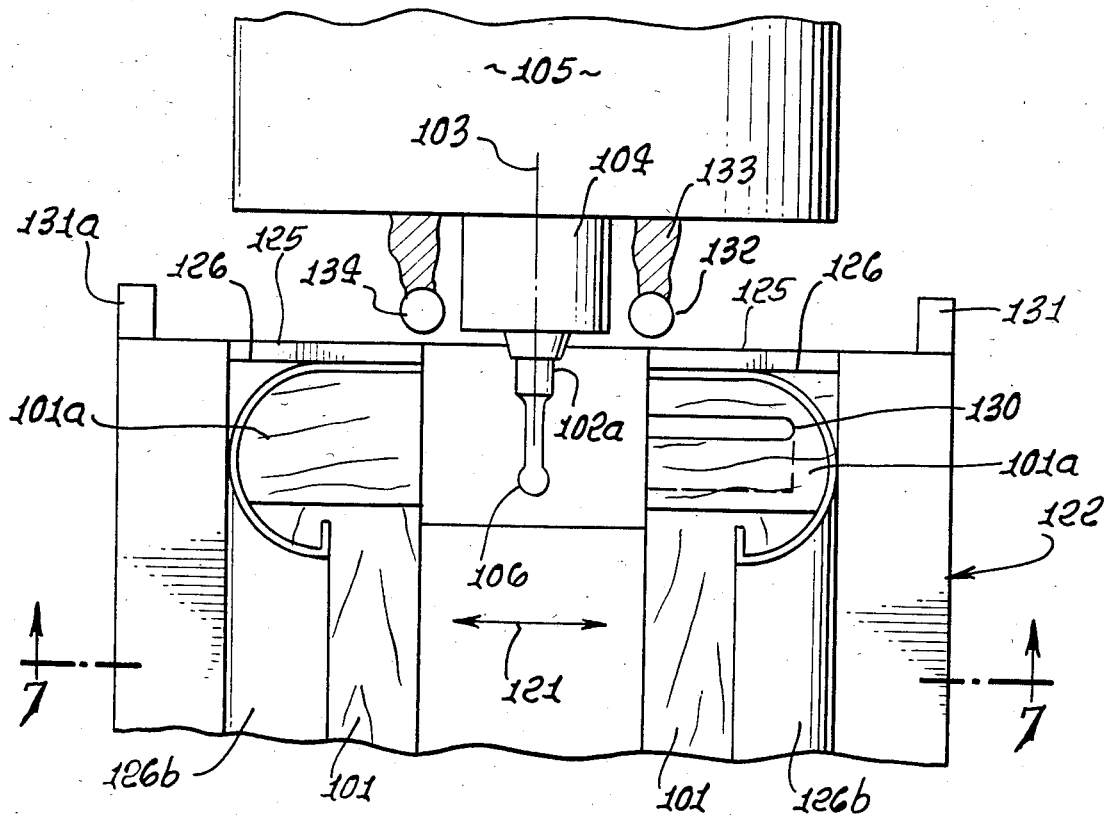

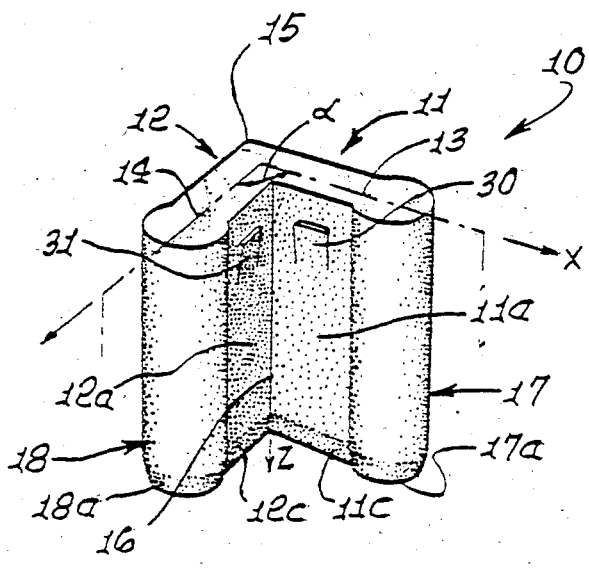
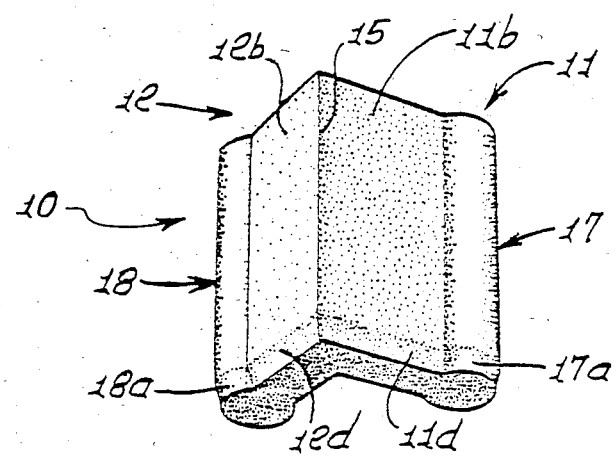
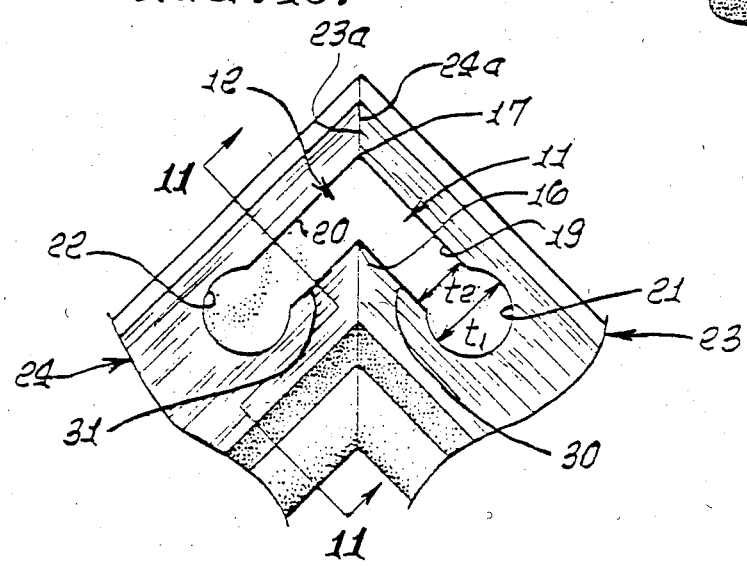

4,593,734

FRAME ROUTING APPARATUS

BACKGROUND OF THE INVENTION

This application is a continuation-in-part of my prior application Ser. No. 535,784 filed Sept. 26, 1983 now U.S. Pat. No. 4,493,583.

This invention relates generally to production of corner brackets for holding frame parts in assembled condition. More particularly, it concerns apparatus to produce recesses in frame parts, which will receive a bracket to lock to such parts.

There is a continuing need for simple, effective, low cost and easily inserted means to hold frame parts in corner assembled condition. The prior use of staples for this purpose is objectionable due to need for a staple gun and lack of staple strength sufficient to hold the frame parts together, against relative bending displacement.

Further, there is need for simple, rugged, and easily operated means to form the above described recesses in frame members, to receive L-shape brackets.

DETAILED DESCRIPTION

It is a major object of the invention to provide a router for cutting an L-shape groove in elongated frame members adapted to have their ends joined in L-shaped assembly by an L-shaped bracket of the particular shape referred to. Basically, the router comprises:

(a) an elongated cutter stem having an axis about which the stem is rotatable the stem having substantially parallelogram cross sections in planes normal to said axis, and (b) a cutter head at the end of the stem and integral therewith, the head also having substantially parallelogram cross sections in planes normal to said axis.

As will appear, the head parallelogram cross sections are typically larger than the stem parallelogram cross sections; the head and stem parallelogram cross sections typically have substantially parallel corresponding sides; and the two sides of the stem are closer to the axis of rotation than most of the corresponding sides of the head, so that space is provided to receive cuttings as the groove is formed in each frame member. Also, two sides of the head are convexly curved, as will appear.

It is a further object of the invention to provide means to rotate the router about its axis, to hold the two frame members in parallel, longitudinally elongated, laterally spaced relation, to be cut by said router head and stem as the router is displaced laterally relative to said frame member ends presented to said router.

These and other objects and advantages of the invention as well as the details of an illustrative embodiment, will be more fully understood from the following specification and drawings, in which:

DRAWING DESCRIPTION

FIG. 1 is a side elevation showing a router incorporating the invention;

FIG. 2 is an end view on lines 2—2 of FIG. 1;

FIGS. 3 and 4 are sections taken on lines 3—3 and 4—4 of FIG. 1.

Figure 11:
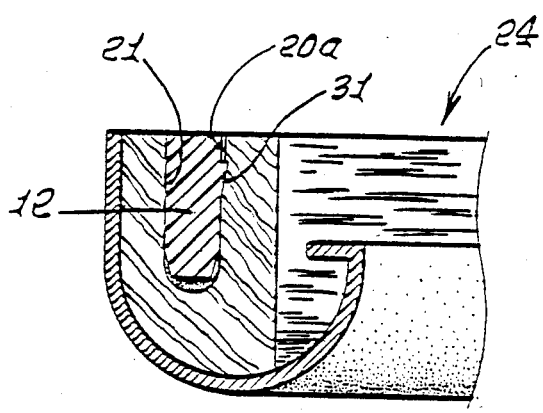
Figure 12:
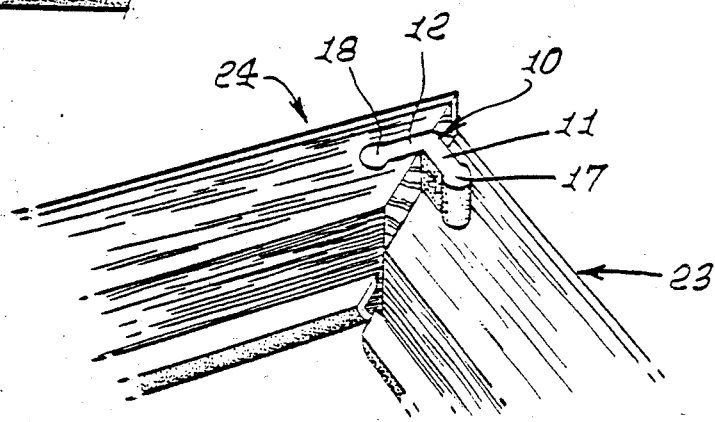
Figure 13:
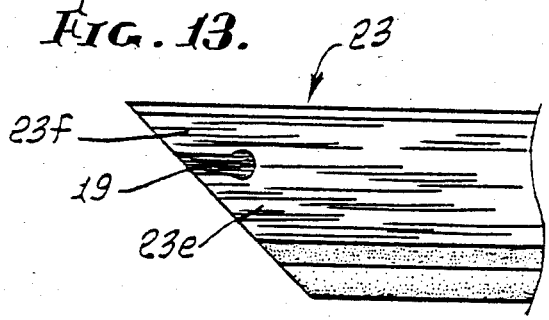
Figure 14:
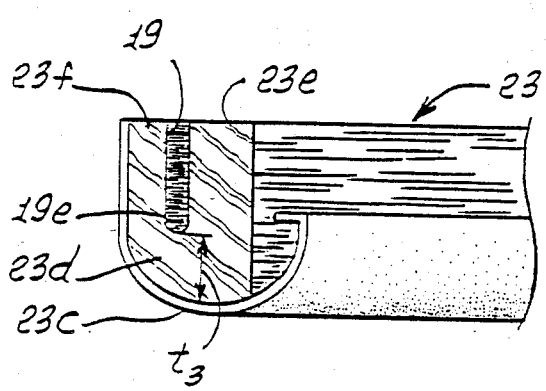

FIG. 5 is a perspective view showing tooling to hold two frame members to be routed by the rotated router;

FIG. 6 is an enlarged plan view of the FIG. 5 tooling;

FIG. 7 is a section taken on lines 7—7 of FIG. 6;

FIG. 8 is a perspective view of one side of a lock-up corner bracket;

FIG. 9 is a perspective view of the opposite side of the FIG. 8 bracket;

FIG. 10 is a plan view showing use of the FIG. 1 bracket in retaining frame parts in assembled conditions;

FIG. 11 is a section on lines 11—11 of FIG. 10;

FIG. 12 is a perspective view showing partial assembly of frame parts and the bracket of FIG. 8;

FIG. 13 is a top plan view of a frame part showing a recess cut thereby to receive one leg of the FIG. 8 bracket, and FIG. 14 is a side view of the frame part of FIG. 13.

DETAILED DESCRIPTION

In FIGS. 8 and 9 the illustrated lock-up corner bracket 10 is shown to include legs 11 and 12 that extend in planes 13 and 14 which define a corner angle $\alpha$. The latter is typically about 90°, but may vary somewhat from 90°, as for example between 85° and 95°. The leg 11 has opposite sides 11a and 11b which are longitudinally elongated in the Z direction indicated by arrow Z, and leg 12 has opposite sides 12a and 12b which are also elongated in the Z direction. Plane 13 is an X-Z plane, and plane 14 is an X-Y plane. Note inside and outside corners 15 and 16 of leg intersections.

The legs have terminal enlargements that are also elongated in parallel directions (parallel to the Z-direction) of forward insertion of the legs relatively into recesses formed in the frame parts, for retaining such parts in assembled relation or conditions. In the example, the enlargements 17 and 18 are integral with legs 11 and 12, respectively, and are columnar, the planes 13 and 14 bisecting the enlargements. Note that the columnar enlargements have lengths approximately equal to the Z-direction lengths of the legs, and they have generally cylindrical outer surfaces throughout such lengths. Note also that the forwardmost end portions of the legs and enlargements are forwardly tapered (see tapers 11c and 11d, 12c 17a and 18a) to assist in their initial slide receptions into the corresponding recesses (leg and column) indicated at 19-22 in frame parts 23 and 24. Such slide reception is close in all such recesses, whereby the frame parts are rigidly positioned, as assembled, with 45° angled surfaces 23a and 24a held in face-to-face, sturdy interengagement. This is enhanced due to the columnar enlargements having cross-sectional dimensions "$t_1$" exceeding the thickness dimension "$t_2$" of the legs, as indicated in FIG. 10.

FIG. 12 shows an easy assembly mode (made possible by the invention) wherein the leg 12 and column 18 are first inserted into the recesses 20 and 22 in part 24; and then the leg 11 and column 17 are relatively inserted into the recesses 19 and 21 in part 23 causing faces 23a and 24a to slide against one another until the assembly is completed with the tops of the legs and columns flush with the surfaces 23a and 24a of the frame parts 23 and 24. The latter frame parts may be those of a picture frame, with a bracket 10 easily assembled to the frame parts at each of the four corners of the picture frame. This enables the frame parts to be incorporated in a small kit suitable for mailing, so that the ultimate user can quickly assemble the frame using the improved corner brackets.

An additional feature is the provision of a barb or barbs on one or both legs of the bracket. See for example barbs 30 and 31 on legs 11 and 12, in FIG. 8. Such barbs integral with the bracket project outwardly from faces 11a and 12a, with forward taper, to compress the recess walls (see for example recess wall 20a in FIG. 11)

during bracket insertion, and grip such walls to resist bracket removal from the recesses (i.e. to ensure that the parts 23 and 24 will remain assembled).

FIGS. 13 and 14 show details of a recess 19 prior to bracket insertion therein. Note that the recess terminates at point 19e, at a considerable spacing "t₃" from the bottom 23c of the frame part, so that the structural strength of the latter is not undesirably reduced (i.e. region 23d of the frame part remains unslotted so that sections 23e and 23f are not undesirably spread apart during bracket insertion). Sections 23e and 23f each have substantially constant width along their length, for maximum strength, as enabled by the insertion.

The frame parts may consist of wood or plastic material, and the bracket may typically consist of plastic material, as for example molded polypropylene.

As is clear from FIG. 9, the forwardmost tapered portions of the legs 11 and 12 and of the enlargements 17 and 18 terminate in a flat plane which is normal to the Z-direction of bracket insertion into the frame parts.

Referring now to FIGS. 1–4, the router 100 is constructed to cut an L-shape groove in elongated frame members (shown for example at 101 in tooling mounted position in FIGS. 6–8) so that such members may have their ends joined in L-shaped assembly by the L-shaped bracket 10 described above in FIGS. 8 to 14.

The metallic router 100 comprises an elongated cutter stem 102 having an axis 103 about which the stem is rotatable, as by driver 104 driven by motor 105. Driver 104 suitably mounts the router, as via an elongated and cylindrical stem extension 102a. The stem has substantially parallelogram cross sections in planes normal to the axis 103, and along the stem length.

The router also has a head 106 integral with and at the end of the stem, the head also having substantially parallelogram cross sections in planes normal to axis 103. Typically, the head cross sections are larger than the stem cross sections.

More specifically, and as shown, the head and stem parallelogram cross sections have parallel corresponding sides. As shown, the stem cross section sides 106–109 correspond to head cross section sides 110–113, sides 106 and 110 being parallel (but side 106 being closer to axis 103 than most of sides 110); sides 107 and 111 being parallel (but side 107 being closer to axis 103 than most of sides 111); sides 108 and 112 being parallel and in the same plane; and sides 109 and 113 being parallel and in the same plane. As a result, chips or cuttings fill into the spaces adjacent sides 106 and 107, and are pulled out when the cutter is sidewardly removed from the frame member. Also, sharp acute angled cutting edges are formed at 140, 141, 142 and 143.

Further, and as shown, the head typically forms two generally outwardly convex outer surfaces indicated at 114 and 115, and coincident with cross section sides 110 and 111, respectively. Surfaces 114 and 115 merge with stem surfaces 106 and 107, as at locations 114a and 115a. The head also has a flat terminal 120 remote from the stem, and in a flat plane normal to axis 103.

Referring now to FIGS. 6 and 7, means is provided to rotate the router about axis 103, and includes the router driver 104 in which the router stem extension 102a is gripped or releasably clamped. A motor 105 rotates the driver. Means is also provided to hold the two elongated frame members 101 in parallel, longitudinally elongated, laterally spaced relation, to be cut by the router head and stem as the router is displaced laterally (see arrows 121) in opposite directions, and relative to the frame member ends 101a presented to the router.

More specifically, the frame member holder means may advantageously and typically include a base 122 having spaced shoulders to position the frame members, and moldings associated with the base. See for example, the two elongated grooves 127a each having opposite, laterally spaced shoulders 123 and 124, between which frame members 101 are fitted. Stops 125 position the ends 126 of the frame members. Frame member moldings are associated with the base, to hold the members in position as shown, during the routing operation. See for example the thin metallic moldings having first portions 126a extending beneath the frame members; second position which curve upwardly at 126b into contact with walls 124, and upper portions extending above the members and projecting back downwardly at 126c.

In operation, the base 122 may be displaced laterally (see arrows 121) to cause the router to sidewardly penetrate the ends of the frame members, forming grooves or recesses therein as shown and described in FIGS. 8 to 14. The depth of the groove is indicated at 130 in FIG. 6, and is controlled by stops associated with the base and router driver. Thus, as the base is moved to the left in FIG. 6, stop 131 on the base engages stop 132 integral with the holder for motor 105, indicated at 133, at which time the router has sidewarly penetrated the frame member to depth 130; and as the base is moved to the right, stop 131a on the base engages stop 134 integral with the motor holder. Suitable laterally elongated guide means for guiding lateral movement of the base is indicated at 137, in FIG. 5.

I claim:

1. In a router for cutting an L-shaped groove in elongated frame members adapted to have their ends joined in L-shaped assembly by an L-shaped bracket,
   (a) an elongated cutter stem having an axis about which the stem is rotatable, the stem having substantially parallelogram cross sections in planes normal to said axis, and
   (b) a cutter head at the end of the stem and integral therewith, the head also having substantially parallelogram cross sections in planes normal to said axis,
   (c) said head forming generally outwardly convex outer surfaces and opposite flat sides intersecting said curved outer surfaces.

2. The router of claim 1 wherein said head parallelogram cross sections are larger than said stem parallelogram cross sections.

3. The router of claim 2 wherein said stem parallelogram cross sections and said head parallelogram cross sections have substantially parallel corresponding sides.

4. The router of claim 2 wherein said stem parallelogram cross sections have two parallel opposite sides which are coincident with two parallel opposite sides of said head cross sections.

5. The router of claim 1 wherein the stem forms opposite flat outer sides which merge with said head opposite flat outer sides.

6. The router of claim 5 wherein the head has a flat terminal remote from the stem.

7. The combination that includes:
   (a) a router for cutting an L-shaped groove in two elongated frame members adapted to have their ends joined in L-shaped assembly by an L-shaped bracket, and including (i) an elongated cutter stem having an axis about which the stem is rotatable, the stem having substantially parallelogram cross sections in planes normal to said axis, and
(ii) a cutter head at the end of the stem and integral therewith, the head also having substantially parallelogram cross sections in planes normal to said axis,
(b) means to rotate the router about said axis extending longitudinally,
(c) means to hold said two frame members in parallel, longitudinally elongated, laterally spaced relation, to be cut by said router head and stem as the router is displaced laterally relative to said frame member ends presented to said router.

8. The combination of claim 7 wherein said (c) means includes a base having spaced shoulders to position said frame members, and member moldings associated with said base.

9. The combination of claim 7 including stops to limit said lateral displacement of the router relative to the frame member ends, the router stem axis extending parallel to length dimensions of the two frame members, at all times.

* * * * *